US012722457B2

(12) United States Patent
Green et al.

(10) Patent No.: US 12,722,457 B2
(45) Date of Patent: Sep. 1, 2026

(54) ADJUSTABLE AND REMOVABLE REAR VEHICLE PANEL

(71) Applicant: Rivian IP Holdings, LLC, Irvine, CA (US)

(72) Inventors: Jeremy Peter Green, Corsham (GB); Joseph Brown, Northville, MI (US)

(73) Assignee: Rivian IP Holdings, LLC, Irvine, CA (US)

( * ) Notice: Subject to any disclaimer, the term of this patent is extended or adjusted under 35 U.S.C. 154(b) by 478 days.

(21) Appl. No.: 18/237,488

(22) Filed: Aug. 24, 2023

(65) Prior Publication Data

US 2025/0065695 A1 Feb. 27, 2025

(51) Int. Cl.
*B60J 1/08* (2006.01)
*B60J 1/18* (2006.01)

(52) U.S. Cl.
CPC ............. *B60J 1/085* (2013.01); *B60J 1/1876* (2013.01)

(58) Field of Classification Search
CPC ............. B60J 7/085; B60J 1/14; B60J 1/1876
See application file for complete search history.

(56) References Cited

U.S. PATENT DOCUMENTS

| | | | | | |
|---|---|---|---|---|---|
| 4,484,773 | A * | 11/1984 | Lehne | B60J 7/1642 | 296/218 |
| 4,512,598 | A * | 4/1985 | Coller | B60J 7/1642 | 292/DIG. 53 |
| 5,346,267 | A * | 9/1994 | Betteridge | B60J 7/1642 | 292/263 |
| 6,010,180 | A * | 1/2000 | Bureau | E05D 1/06 | 296/146.16 |
| 6,694,675 | B1 * | 2/2004 | Craft | B60J 7/1642 | 292/263 |
| 6,908,124 | B2 * | 6/2005 | Colicino | E05B 13/10 | 292/262 |
| 12,330,488 | B2 * | 6/2025 | Marega | B60J 9/02 | |
| 2011/0265383 | A1 * | 11/2011 | Lewno | B60J 10/70 | 49/130 |
| 2025/0257593 | A1 * | 8/2025 | Wolf | E05D 11/06 | |

FOREIGN PATENT DOCUMENTS

| | | | | |
|---|---|---|---|---|
| DE | 19926140 A1 * | 12/2000 | | B60J 1/14 |
| EP | 554839 A1 * | 11/1993 | | |
| JP | S6159765 U * | 4/1986 | | |
| KR | 100188593 B1 * | 6/1999 | | B60J 1/14 |

* cited by examiner

*Primary Examiner* — Jason S Morrow
(74) *Attorney, Agent, or Firm* — HG LAW LLP

(57) ABSTRACT

Systems and methods are presented herein for a hinge assembly for adjusting, removing, and reinstalling a panel on a vehicle. The hinge assembly comprises a mount fixedly attached to a surface. A hinge body is affixed to the mount by a first hinge. A bracket is fixedly attached to a panel coupled to the hinge body by a second hinge. A release lever is configured to release the bracket from the hinge body.

19 Claims, 11 Drawing Sheets

100A
100B
100C
102
104
106
108
110
112
114
116
118
120
122
124
126
128
130
132
134

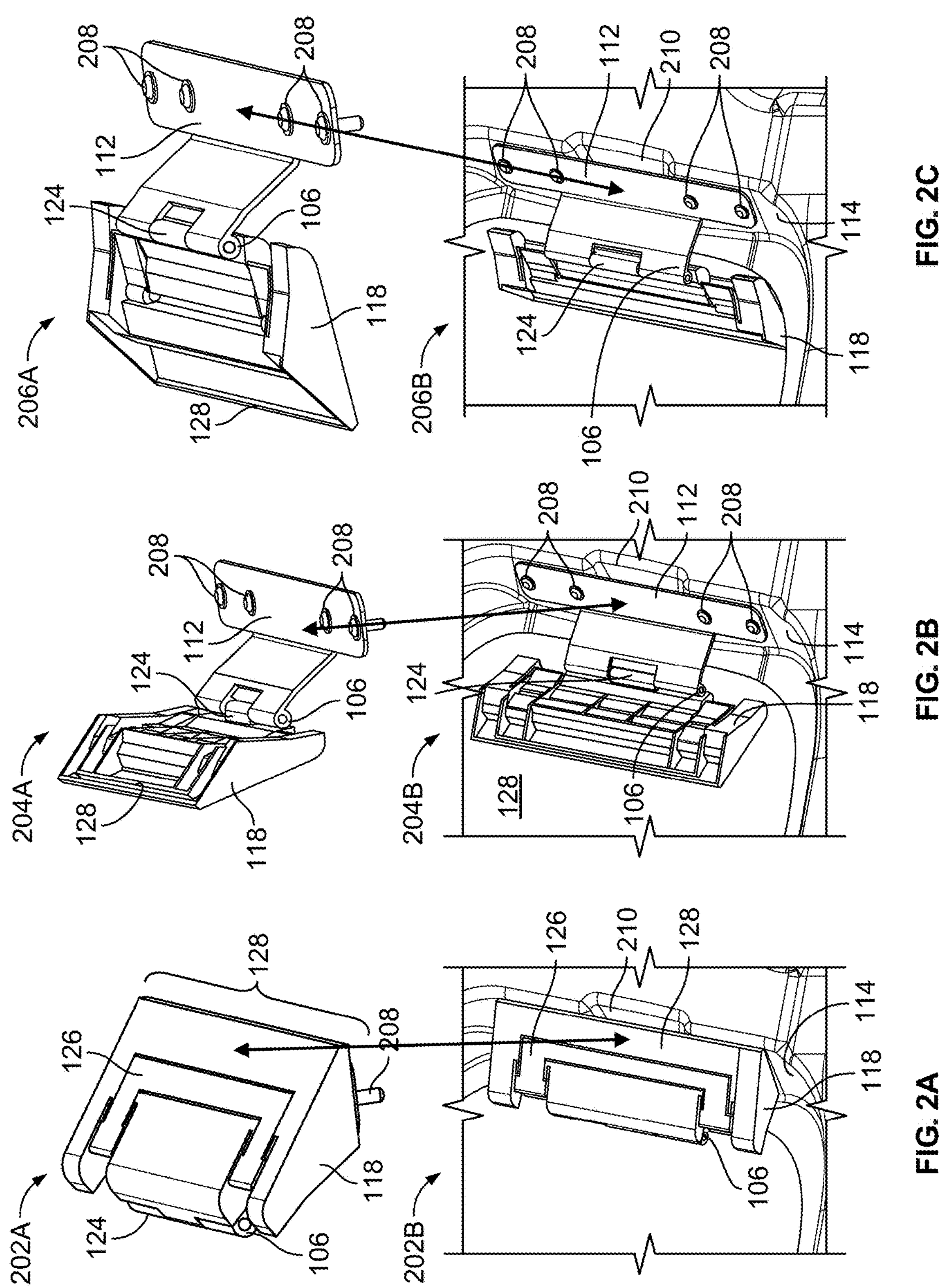

404A
302
206B
304
406A
408
412
410
304
404B
114
302
206B
414

406B
114
408
412
414

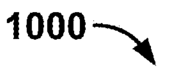
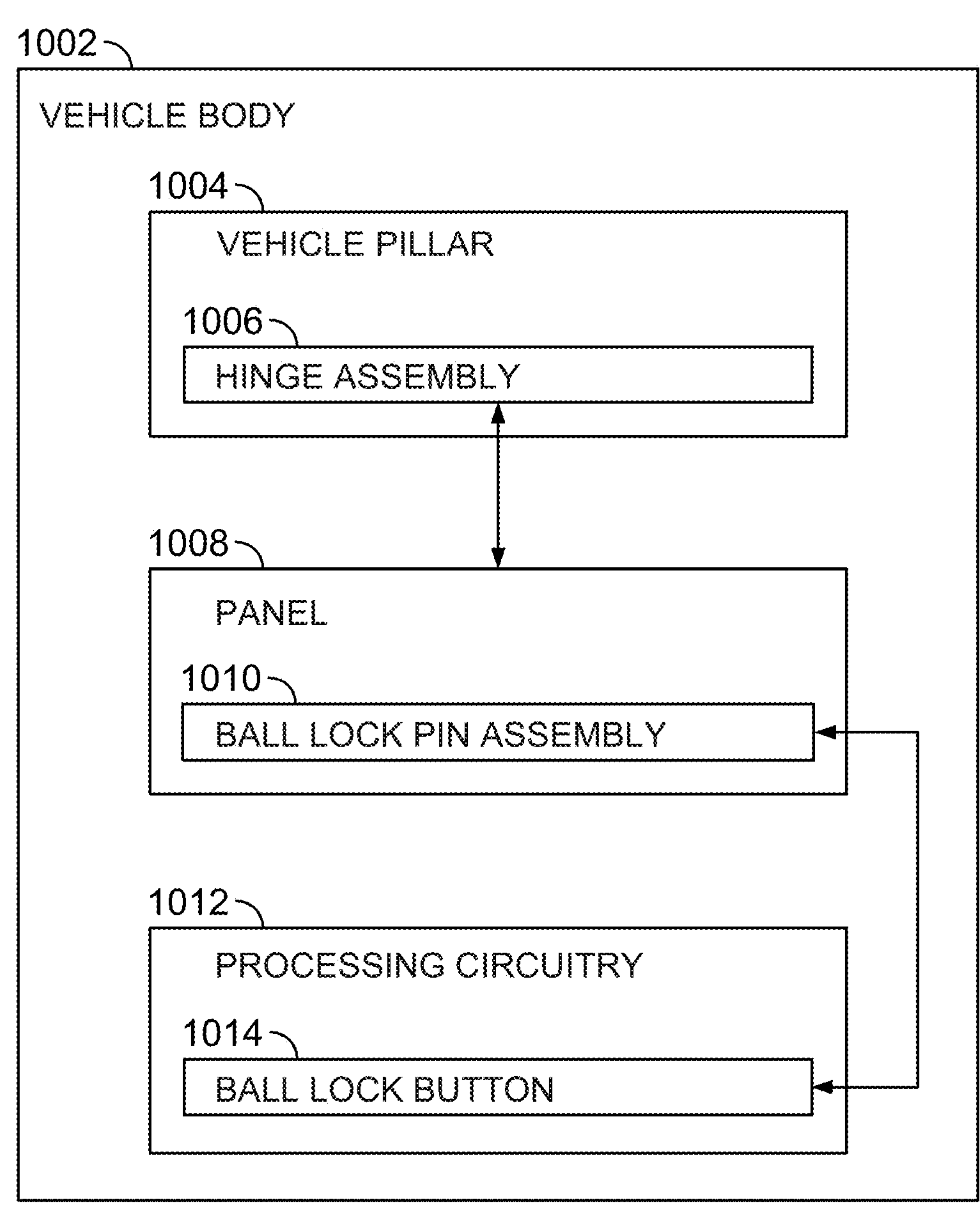
FIG. 10

ADJUSTABLE AND REMOVABLE REAR VEHICLE PANEL

INTRODUCTION

The present disclosure is directed to systems and methods including a panel of a vehicle that can be arranged in different positions and is removeable from the vehicle.

SUMMARY

Some vehicle assemblies include adjustable or removeable external panels (e.g., glass windows behind the driver and front seat passenger windows), which may be limited in their adjustability or operation.

Described herein are hinge assemblies that enable a user to adjust a vehicle panel (e.g., a rear window) to multiple different positions including, for example, fully closed and seated in a vehicle opening, vented at one end, perpendicular to the vehicle opening, and removed from the vehicle body to have an opening in the vehicle body. In some embodiments, the hinge assemblies of this disclosure can be articulated without the use of a tool kit separate from the described hinge assemblies.

In some embodiments, the disclosure is directed to a hinge assembly comprising a mount fixedly attached to a surface and a bracket fixedly attached to a panel. Fixedly attached, as used herein, may mean one or more of a first part integrated into or with a second part. Additionally, or alternatively, fixedly attached as used herein may correspond to a first component becoming part of a second component, thereby resulting in an assembly or subassembly comprised of at least the first or second component, part, or element. In some embodiments, the bracket may be part of the panel or fixedly attached to the panel. A hinge body is affixed to the mount by a first hinge and the bracket is coupled to the hinge body by a second hinge. A release lever is configured to release the bracket from the hinge body.

The hinge assemblies of this disclosure can provide improved adjustability and operation. In particular, the hinge assemblies of this disclosure do not constrain positioning of the panel to either completely closed, forming a closed surface of a vehicle body, or completely removed enabling exposure of an opening in the vehicle body to the environment around the vehicle. Thus, a user of a vehicle with a hinge assembly of the disclosure can use the hinge assembly to create a passive vent for passengers positioned near the panel with the hinge assembly and the user can also position the panel in a manner that allows access to the interior of the vehicle while keeping the panel affixed to the vehicle (e.g., while the vehicle is parked, the panel can be arranged perpendicular to the vehicle body or opening in the vehicle body so electrical terminals or other vehicle accessories within the vehicle can be accessed without opening vehicle doors). Additionally, in some examples, this approach does not require the use of a tool kit to remove the panel. By incorporating a handle with a pair of hinges in the hinge assembly, the panel can be physically detached from a mount to which the hinge assembly is secured by articulating certain features of the hinge assembly. The panel can then be reattached without additional tools by performing the removal steps in reverse. This approach also allows for a low profile hinge assembly to be incorporated into the interior panels of the vehicle (e.g., in a vehicle pillar) to allow for more space for storage or passengers near a vehicle pillar where the hinge assembly is installed.

In some embodiments, the hinge body comprises a handle configured to rotate about the first hinge. Additionally, a releasable coupling interface that forms one or more of a mechanical, magnetic, or electromagnetic connection between the hinge body and one or more of the surface of a pillar or a mount fixedly attached to the surface of the pillar. The bracket of the hinge assembly is fixedly attached to a panel (e.g., a glass panel of rear window of a vehicle body).

In some embodiments, the release lever is spring loaded. The release lever releases the bracket when a force is applied to a surface of the release lever. The release lever returns to an original position when the force applied to the surface of the release lever is removed.

In some embodiments, the mount is fixedly attached to a surface of a vehicle pillar. In some embodiments, the bracket is coupled to the hinge body by the second hinge via one or more contact points. The release lever is configured to release a hook that interfaces with a rod of the bracket when the release lever is actuated.

In some embodiments, the hinge body is comprised of plastic and the mount comprises a metal plate that is fixedly attached to a vehicle pillar.

In some embodiments, the disclosure is directed to a vehicle window assembly comprising a glass panel fixedly attached a hinge assembly. The hinge assembly comprises a mount fixedly attached to a surface, a hinge body affixed to the mount by a first hinge, a bracket fixedly attached to a first end of the glass panel, the bracket coupled to the hinge body by a second hinge, and a release lever configured to release the bracket from the hinge body. The vehicle window assembly also comprises a ball lock pin assembly fixedly attached to the glass panel at a second end.

In some embodiments, the vehicle window assembly further comprises a handle configured to rotate about the hinge assembly and comprising a releasable coupling interface that forms one or more of a mechanical, magnetic, or electromagnetic connection between the hinge body and one or more of the surface of a pillar or a mount fixedly attached to the surface of the pillar. In some embodiments, the ball lock pin is configured to release the second end of the glass panel when actuated.

In some embodiments, the vehicle window assembly further comprises a padded gasket arranged around a perimeter of the glass panel. Additionally, or alternatively, the hinge assembly comprises a first hinge, a second hinge, and a hinge body. The first hinge corresponds to an axis of rotation for the release lever and the hinge body. The second hinge corresponds to an axis of rotation for the glass panel. In some embodiments, the glass panel is comprised of tempered glass. Additionally, or alternatively, the release lever is configured to release a hook that interfaces with the bracket when the release lever is actuated.

In some embodiments, the disclosure is directed to a vehicle pillar assembly comprising a pillar surface facing an interior of a vehicle and comprising a recess, and a hinge assembly for actuating a panel, the hinge assembly comprising a handle arranged within the recess. A surface of the hinge assembly is flush with the pillar surface, a gap is arranged between the handle and the recess, and the panel is removably coupled to the hinge assembly. In some embodiments, the vehicle pillar assembly further comprises a releasable coupling interface that forms one or more of a mechanical, magnetic, or electromagnetic connection between the hinge body and one or more of the surface of a pillar or a mount fixedly attached to the surface of the pillar.

In some embodiments, the disclosure is directed to a method of removing a panel of a vehicle. A panel is moved from a closed position to a vented position. A handle of a hinge body is rotated about a first axis, relative to a pillar. The panel is rotated about a second axis relative to the hinge body. A release lever is moved to disengage the panel from the hinge body. In some embodiments, moving the panel comprises actuating a ball lock pin assembly such that the panel rotates about the second axis to achieve the vented position.

BRIEF DESCRIPTIONS OF THE DRAWINGS

The above and other objects and advantages of the disclosure may be apparent upon consideration of the following detailed description, taken in conjunction with the accompanying drawings, in which:

FIGS. 1A, 1B, and 1C each depict cross-sectional views of an exemplary hinge assembly of this disclosure during different steps of removing a panel affixed to the hinge assembly from a vehicle body to create an opening in the vehicle body, in accordance with some embodiments of the disclosure;

FIGS. 2A, 2B, and 2C each depict different angled views of an exemplary hinge assembly during different steps of articulating a panel affixed to the hinge assembly to create an opening in a vehicle body, in accordance with some embodiments of the disclosure;

FIG. 3 depicts an example vehicle assembly comprised of an exemplary panel of this disclosure, in accordance with some embodiments of the disclosure;

FIGS. 4A, 4B, 4C, and 4D illustrate different positions of an exemplary panel from both a vehicle internal perspective and a vehicle external perspective based on adjustment of a hinge assembly of this disclosure and a ball lock pin assembly that are affixed to the panel, in accordance with some embodiments of the disclosure;

Figure 7A:
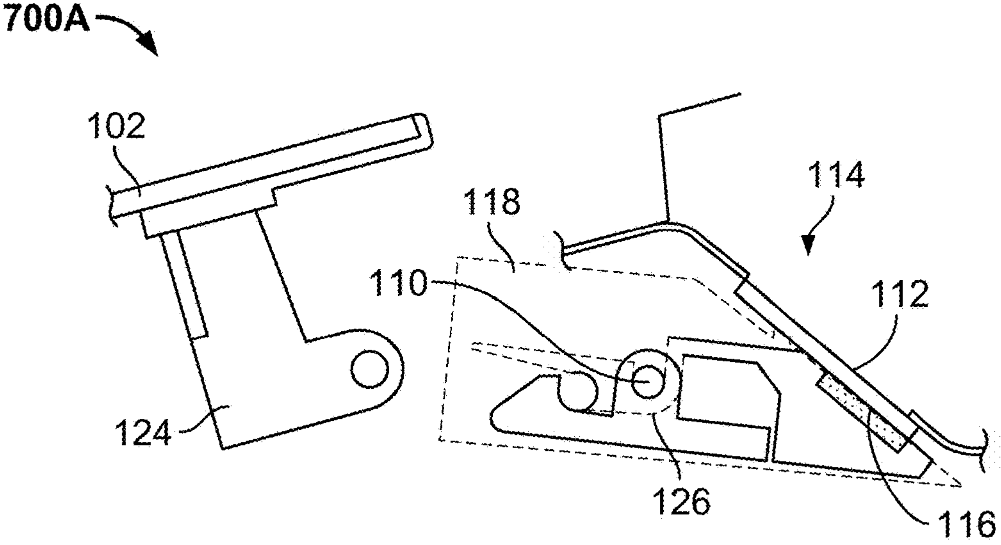
Figure 7B:
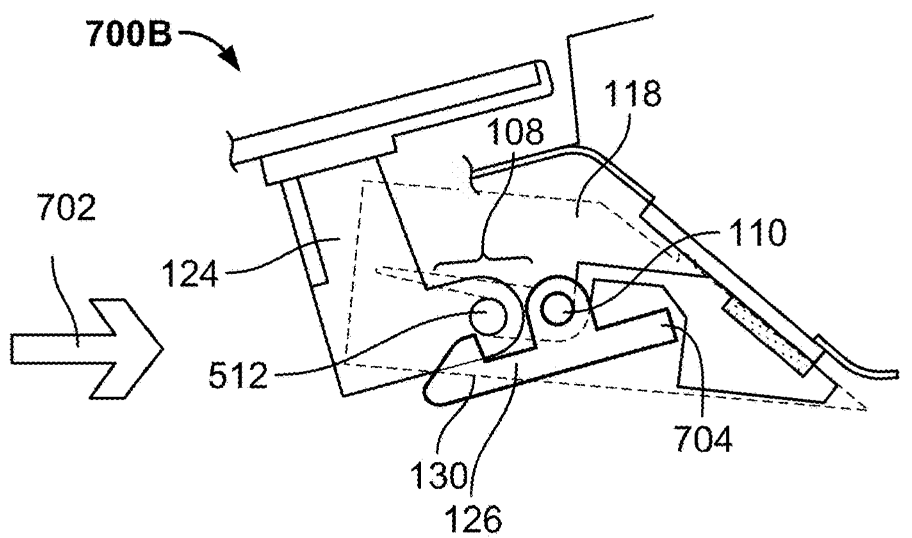
Figure 7C:
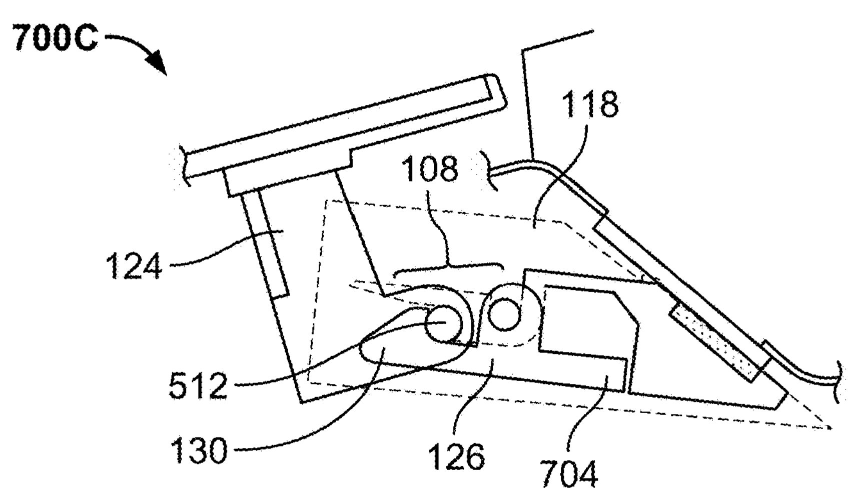
Figures 8, 9:
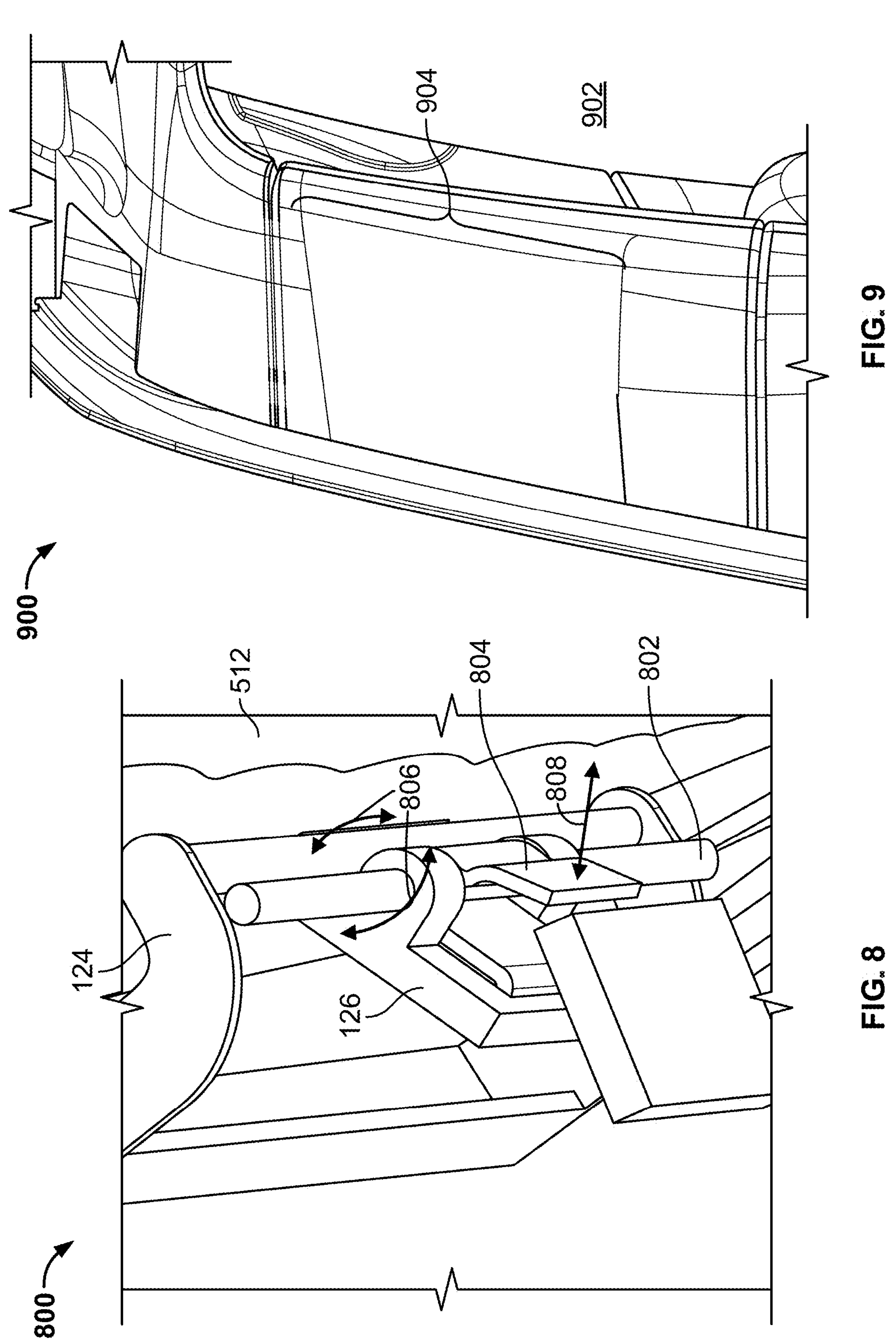
Figure 11:
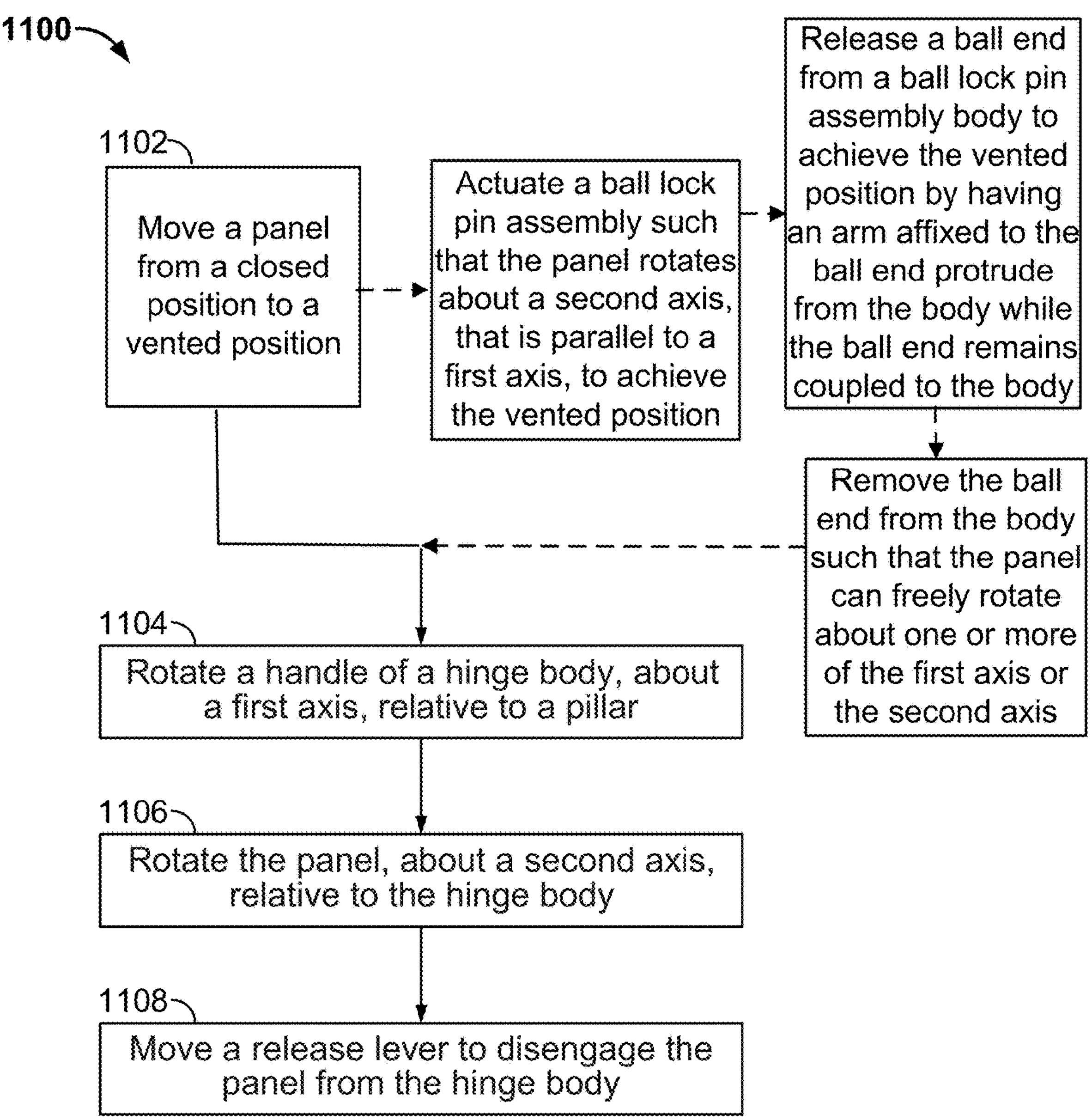

FIGS. 7A, 7B, and 7C each depict different steps of reinstalling an exemplary panel of this disclosure onto a vehicle opening, in accordance with some embodiments of the disclosure;

FIG. 8 depicts an example hinge assembly comprised of an example spring, in accordance with some embodiments of the disclosure;

FIG. 9 depicts an example pillar surface of a vehicle pillar for installing a hinge assembly of this disclosure, in accordance with some embodiments of the disclosure;

FIG. 10 is a block diagram of an example vehicle assembly comprised of a panel and a hinge assembly of this disclosure, in accordance with some embodiments of the disclosure; and FIG. 11 is a flow chart of an exemplary method of removing a vehicle panel via a hinge assembly of this disclosure, in accordance with some embodiments of the disclosure.

DETAILED DESCRIPTION

Methods and systems are provided herein for hinge assemblies that allow for articulation and removal of a panel from a vehicle body while also allowing the panel to be reinstalled onto the vehicle body at the hinge assembly without the use of a tool or a tool kit.

Figures 1A, 1B, 1C:
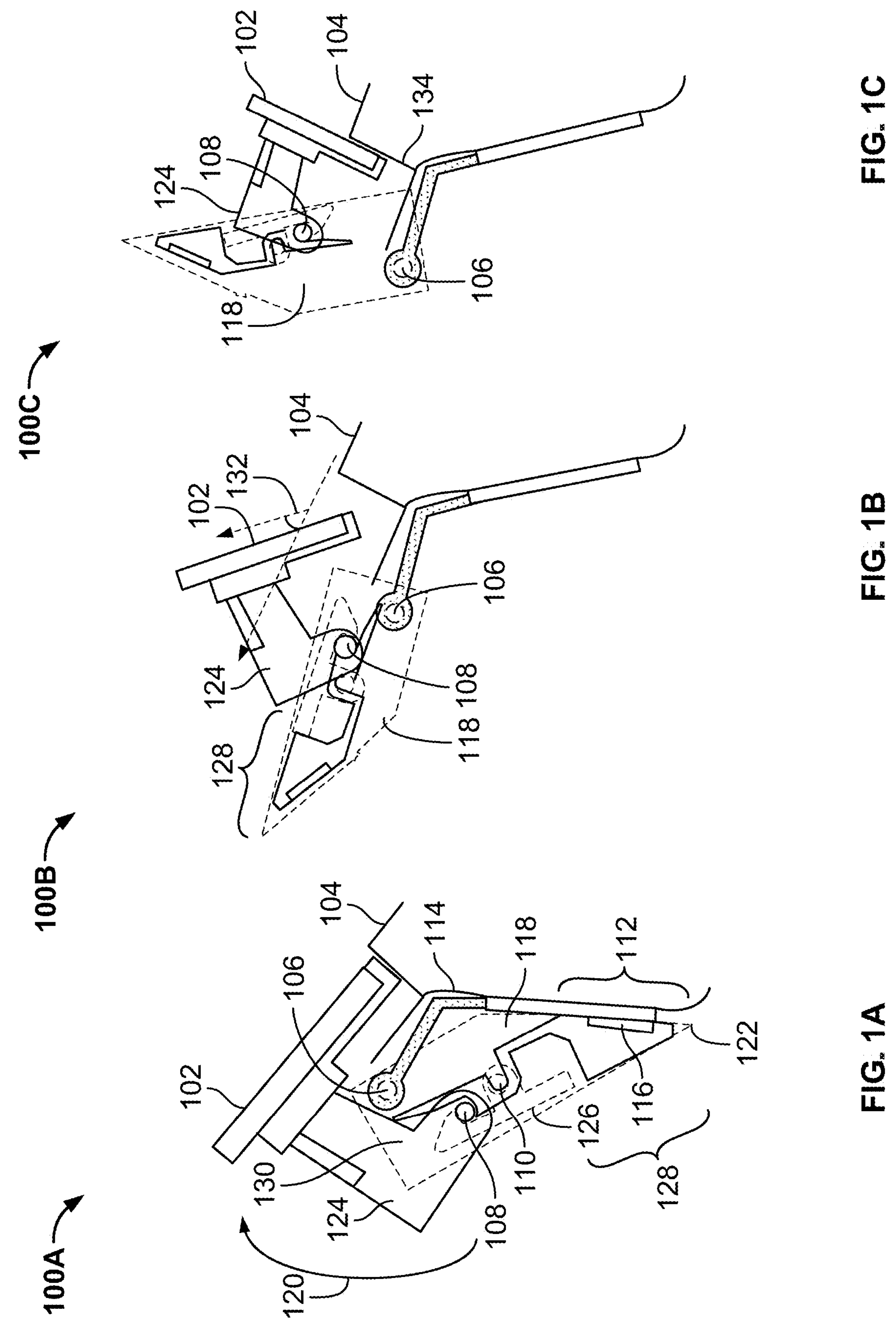

FIGS. 1A, 1B, and 1C each depict cross-sectional views of an exemplary hinge assembly of this disclosure with different levels of transparency for different components for the purposes of illustrating the different components of the assembly. Each of FIGS. 1A, 1B, and 1C depict how components of the hinge assembly move relative to each other during different steps of articulating a panel that is affixed to the hinge assembly to create an opening in the vehicle body, in accordance with some embodiments of the disclosure. The components and assemblies depicted in FIGS. 1A, 1B, and 1C may be incorporated, in whole or in part, into any of the assemblies and components depicted in FIGS. 2A-10. The hinge assembles depicted in FIGS. 1A, 1, and 1C may also be used to execute the method of FIG. 11.

FIG. 1A shows hinge assembly 100A in a configuration where vehicle panel 102 (e.g., a rear quarter glass or other panel that can be adjusted to rotate about one or more axes and is not configured to ascend out of a vehicle side panel or descend into a vehicle side panel) is arranged in a closed position relative to vehicle body 104 (e.g., an outer surface of vehicle panel 102 is level with or recessed from the outer surface of vehicle body 104) based on the arrangement of the components of hinge assembly 100A relative to first hinge 106 (e.g. a hinge that defines an axis of rotation for hinge body 118 and release lever 126), second hinge 108 (e.g., a hinge that defines an axis of rotation for bracket 124 and panel 102), and third hinge 110 (e.g., a hinge that defines an axis of rotation for release lever 126 relative to hinge body 118). In some embodiments, vehicle panel 102 comprises an adjustable lid or door to one or more compartments, enclosures, or finished interiors of the vehicle (e.g., corresponding to a storage compartment, a passenger compartment, or combinations thereof).

Mount 112 is fixedly attached to pillar 114. In some embodiments, mount 112 is comprised of a metal strong enough to withstand a moment about pillar 114 created by the weight and use of hinge assembly 100A such that mount 112 does not elastically or plastically deflect during installation or actuation of panel 102 via hinge body 118. Mount 112 may be fixedly attached to pillar 114 by at least one of an adhesive, one or more fasteners, or one or more features that couple a body to a surface (e.g., a combination of an extension and a recess). Pillar 114 may, for example, be a surface of a vehicle pillar (e.g., a vehicle B or C pillar) or may be a surface of an interior panel fixedly attached to a vehicle pillar. Mount 112 also comprises releasable coupling interface 116 (e.g., a coupling interface that forms one or more of a mechanical, magnetic, or electromagnetic connection between the hinge body and one or more of a surface of a pillar or a mount affixed or coupled to the surface of the pillar, which may comprise one or more of at least one magnetic surface arranged on hinge body 118 or some other attachment element, fixture, or structure for pairing two surfaces together). In some embodiments, releasable coupling interface 116 may comprise one or more of a suction based interface for coupling components, a hook configured to be inserted into or lock with a looped structure, or a form of temporary adhesion. Hinge body 118 rotates along path 120 via first hinge 106 when enough force is applied to end 122 of hinge body 118 to displace end 122 from releasable coupling interface 116 and the surface of mount 112. The force applied to end 122 may result in a rotational moment about first hinge 106 such that hinge body 118 rotates along path 120. End 122 corresponds to a surface of handle 128. Handle 128 enables a user to reach between end 122 and pillar 114 to rotatably actuate hinge body 118 about first hinge 106. In some embodiments, hinge body 118 is comprised of a plastic or polyurethane suitable for vehicle interiors and strong enough to handle a moment caused by the weight of panel 102 when affixed to hinge body 118 by bracket 124.

Hinge assembly 100A is also comprised of bracket 124. Bracket 124 is fixedly attached to panel 102. Bracket 124 is also coupled to hinge body 118 by second hinge 108. Bracket 124 is configured to be rotatably actuated about second hinge 108. Bracket 124 is configured to be released from hinge body 118 by release lever 126. Release lever 126 is coupled to hinge body 118 by third hinge 110. Release lever 126 is configured to be rotatably actuated about third hinge 110. In some embodiments, release lever 126 comprises a spring body (e.g., as shown in FIG. 8) that is configured to return release lever 126 to the orientation depicted in FIG. 1A after release lever 126 is pressed to release bracket 124 or pressed to rotate release lever 126 about third hinge 110 to receive bracket 124 at second hinge 108 (e.g., as shown in FIGS. 7A, 7B, and 7C).

Release lever 126 also comprises hook 130 which interfaces with bracket 124 at second hinge 108. Bracket 124 may comprise, for example, a rod that extends from a first end of bracket 124 to a second end of bracket 124, creating a structure on which hook 130 can latch into order to rotatably couple bracket 124 to hinge body 118. Hook 130 is also configured to release the rod of bracket 124 to release bracket 124 from second hinge 108 when release lever 126 is pressed towards surface 114 to rotate release lever 126 about third hinge 110.

FIG. 1B shows hinge assembly 100B, which is comprised of the same components of hinge assembly 100A, with panel 102 arranged in an angled position (e.g., open more than vented as enabled by a ball lock pin assembly but not open enough to be considered relatively perpendicular to a vehicle side panel). The angled position of panel 102 is defined, at least in part, by angle 132. Angle 132 is an angle between a surface of panel 102 and a surface of vehicle body 104. Angle 132 may be more than 0 degrees and may be less than 90 degrees. In some embodiments, the angled position may be achieved while a vehicle comprised of vehicle body 104 is moving and the vented position corresponds to angle 132 being 45 degrees or less. Angle 132 is achieved by using handle 128 to rotate hinge body 118 about one or more of an axis defined by first hinge 106 or an axis defined by second hinge 108. In some embodiments, panel 102 may also be used to adjust angle 132 by rotating bracket 124 about second hinge 108.

FIG. 1C shows hinge assembly 100C, which is comprised of the same components of hinge assemblies 100A and 100B, with panel 102 arranged against bump stop 134 of vehicle body 104 to prevent further rotation of hinge body 118 and panel 102 about first hinge 106. Additionally, or alternatively, bump stop 134 may also prevent further rotation of bracket 125 about second hinge 108. Bump stop 134 is structured to prevent angle 132 of FIG. 1B from exceeding 90 degrees. Bump stop 134 may comprise any suitable material to prevent scratching or otherwise deforming panel 102.

Each of first hinge 106 and second hinge 108 may be articulated about respective axes defined by one or more of a pin or other rod that extends at least partially along a width of bracket 124. In some embodiments, first hinge 106 defines a first rotational axis that is parallel to a second rotational axis defined by second hinge 108. Rotation about each of first hinge 106 and second hinge 108 enables different angles of articulation for panel 102 relative to vehicle body 104 and bump stop 134. In some embodiments, rotating panel 102 about second hinge 108 allows panel 102 to rotate between a closed and a vented or angled position, where the vented position is open only a small amount, for example, for providing air circulation while the vehicle is moving whereas the angled position corresponds to a larger opening that likely would not be used while the vehicle is moving considering panel 102 would be pressed back towards the vented position or the closed position due to one or more of momentum shifts or wind drag caused by vehicle movement. Additionally, or alternatively, first hinge 106 enables hinge body 118 to swing outside of vehicle body 104. As a result, second hinge 108 is displaced from inside vehicle body 104 and enables panel 102 to achieve a wide open position. This wide open position would provide vehicle users to access or remove items from the vehicle while also providing ventilation while the vehicle is stationary.

FIGS. 2A, 2B, and 2C each depict different angled views of an exemplary hinge assembly during different steps of articulating a panel affixed to the hinge assembly to create an opening in a vehicle body exterior while the hinge assembly is fixedly attached to an interior portion of the vehicle body, in accordance with some embodiments of the disclosure. Each of FIGS. 2A, 2B, and 2C depict how components of the hinge assembly may move relative to each other during different steps of articulating a panel that is affixed to a bracket of the hinge assembly to create an opening in the vehicle body, in accordance with some embodiments of the disclosure. The components and assemblies depicted in FIGS. 2A, 2B, and 2C may be incorporated, in whole or in part, into any of the assemblies and components depicted in FIGS. 1A-1C and 3-10. The hinge assemblies depicted in FIGS. 2A, 2B, and 2C may also be used to execute the method of FIG. 11. The hinge assemblies of FIGS. 2A-2C correspond to angled views of the side cross sectional views of hinge assembles 100A-C, respectively.

FIG. 2A shows closed hinge assembly 202A and mounted closed hinge assembly 202B. Closed hinge assembly 202A depicts an uninstalled version (e.g., angled and floating in space) of mounted closed hinge assembly 202B, which is depicted at a different angle from closed hinge assembly 202A and is shown installed in an opening of a vehicle body. The arrow of FIG. 2A connecting closed hinge assembly 202A and mounted closed hinge assembly 202B corresponds to a part of closed hinge assembly 202A that is also shown as part of mounted closed hinge assembly 202B. Closed hinge assembly 202A and mounted closed hinge assembly 202B are each comprised of hinge body 118, handle 128, first hinge 106, and release lever 126, all from FIG. 1. Mounted closed hinge assembly 202 B is fixedly attached to a surface of pillar 114. In some embodiments, one or more of fasteners 208 of closed hinge assembly 202A may be used to secure closed hinge assembly 202A to the surface of pillar 114 to create mounted closed hinge assembly 202B. The assemblies of FIG. 2A correspond to the assembly depicted in FIG. 1A. Mounted closed hinge assembly 202B is depicted as being positioned near gap 210, where a user may insert fingers to provide a force on handle 128 to rotate hinge body 118 about first hinge 106 (e.g., as shown in FIG. 2B). A portion of bracket 124 is also shown. The portion shown is not a part of bracket 124 that is fixedly attached to a panel (e.g., panel 102 of FIGS. 1A-1C). The portion shown corresponds to a portion of bracket 124 configured to be rotatably actuated about second axis 108 of FIGS. 1A-1C. Bracket 124 is shown as having two points of contact with first hinge 106. In some embodiments, a single point of contact may be used to couple bracket 124 to first hinge 106.

FIG. 2B shows vented hinge assembly 204A and mounted vented hinge assembly 204B. Vented hinge assembly 204A depicts an uninstalled version (e.g., angled and floating in space) of mounted vented hinge assembly 204B, which is depicted at a different angle from vented hinge assembly 204A and is shown installed in an opening of a vehicle body. The arrow of FIG. 2B connecting vented hinge assembly 204A and mounted vented hinge assembly 204B corresponds to a part of vented hinge assembly 204A that is also shown as part of mounted vented hinge assembly 204B. Vented hinge assembly 204A and mounted vented hinge assembly 204B are each comprised of hinge body 118, handle 128, first hinge 106, and release lever 126, all from FIG. 1. Mounted vented hinge assembly 204B is fixedly attached to a surface of pillar 114 via fasteners 208. More or fewer than the depicted fasteners 208 may be used to secure vented hinge assembly 204A to a surface of pillar 114 to create mounted vented hinge assembly 204B. The assemblies of FIG. 2B correspond to the assembly depicted in FIG. 1B. Mounted vented hinge assembly 204B is depicted as being positioned near recess 210 after a user may have provided a force on handle 128 to rotate hinge body 118 about first hinge 106 (e.g., as shown in FIG. 2B). Mounted vented hinge assembly 204B is fixedly attached to the surface of pillar 114 via mount 112, through which fastener 208 extend. Mount 112 may extend partially over gap 210.

FIG. 2C shows extended hinge assembly 206A and mounted extended hinge assembly 206B. Extended hinge assembly 206A depicts an uninstalled version (e.g., angled and floating in space) of mounted extended hinge assembly 206B, which is depicted at a different angle from extended hinge assembly 206A and is shown installed in an opening of a vehicle body. The arrow of FIG. 2C connecting extended hinge assembly 206A and mounted extended hinge assembly 206B corresponds to a part of extended hinge assembly 206A that is also shown as part of mounted extended hinge assembly 206B. Extended hinge assembly 206A and mounted extended hinge assembly 206B are each comprised of hinge body 118, handle 128, first hinge 106, and release lever 126, all from FIG. 1. Mounted extended hinge assembly 206B is fixedly attached to a surface of pillar 114 via fasteners 208. More or fewer than the depicted fasteners 208 may be used to secure extended hinge assembly 206A to a surface of pillar 114 to create mounted extended hinge assembly 206B. The assemblies of FIG. 2C correspond to the assembly depicted in FIG. 1C. Mounted vented hinge assembly 206B is depicted as being positioned near recess 210 after a user may have provided a force on handle 128 to rotate hinge body 118 about first hinge 106 (e.g., as shown in FIG. 2B) until a panel affixed to bracket 124 contacts a bump stop (e.g., bump stop 134 of FIG. 1C arranged external to a vehicle body comprised of pillar 114). Mounted extended hinge assembly 206B is fixedly attached to the surface of pillar 114 via mount 112, through which fastener 208 extend. Mount 112 may extend partially over gap 210. Mounted extended hinge assembly 206B may be used to remove a panel fixedly attached to bracket 124 from hinge body 118 by removing bracket 124 from first hinge 106 in response to actuation of a release lever (e.g., release lever 126).

Figure 3:
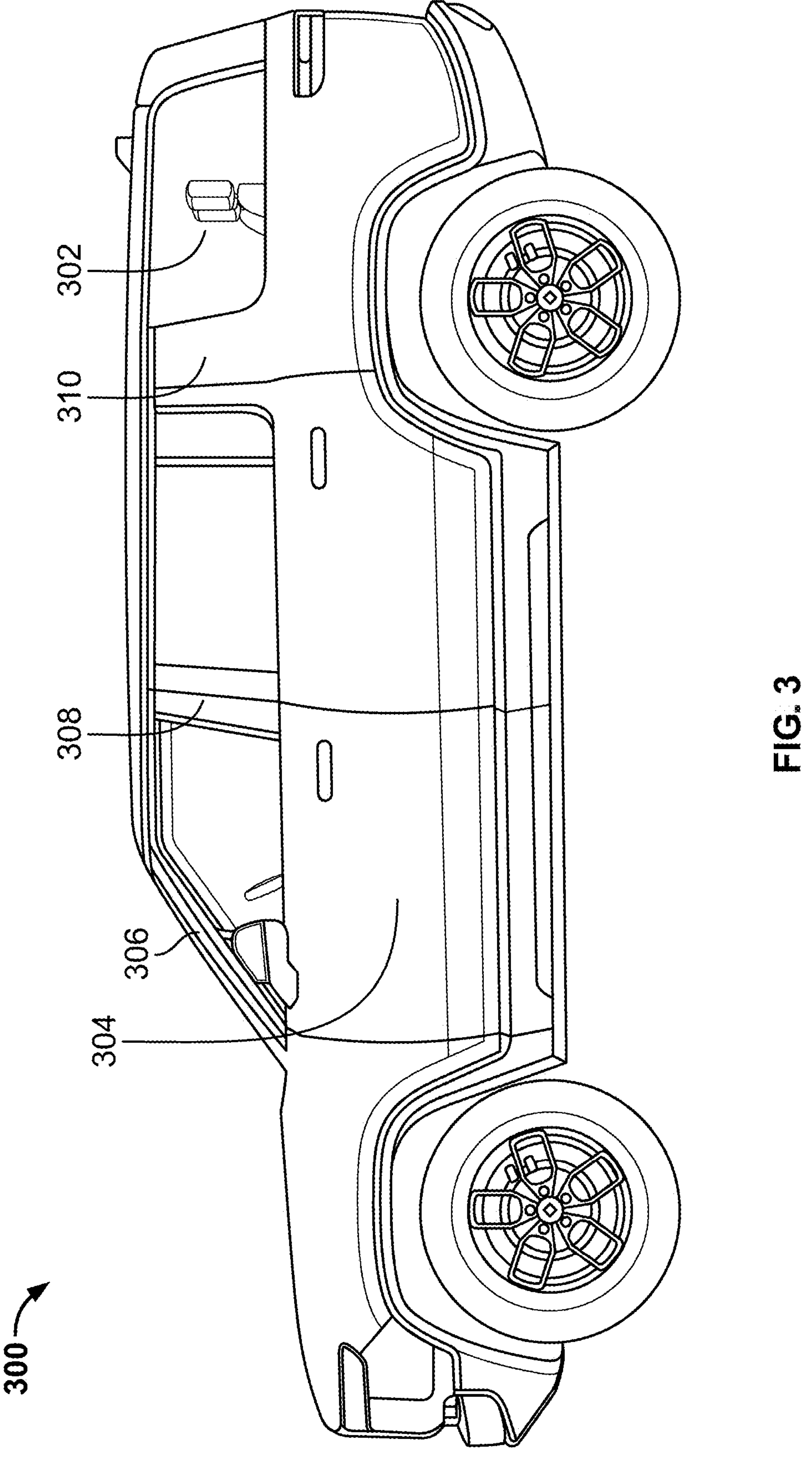

FIG. 3 depicts vehicle assembly 300 comprised of glass panel 302 of this disclosure, in accordance with some embodiments of the disclosure. Vehicle assembly 300 may incorporate, in whole or in part, any of the components and assemblies depicted in FIGS. 1A-2C and 4A-10. Vehicle assembly 300 may also incorporate one or more assemblies or components configured to enable execution of the method of FIG. 11.

Glass panel 302 is coupled to vehicle assembly 300. Panel 102 of FIGS. 1A-1C corresponds to a portion of glass panel 302 that is affixed to bracket 124 of FIGS. 1A-1C. Bracket 124 is not shown in FIG. 3. Vehicle assembly 300 is comprised of vehicle body 304. Vehicle body 304 is depicted with A-pillar 306, B-Pillar 308, and C-Pillar 310. Glass panel 302 is arranged rearward of C-Pillar 310 on vehicle body 304. In some embodiments, panel 304 is a glass panel corresponding to a window that can be vented or removed entirely from vehicle body 304. Panel 304 may also be arranged forward of either B-pillar 308 or C-Pillar 310. Panel 304 may be arranged anywhere on vehicle body 304 where an opening to a passenger or storage area in vehicle assembly 300 is desired.

FIGS. 4A, 4B, 4C, and 4D illustrate different positions of glass panel 302 from both a vehicle internal perspective and a vehicle external perspective based on adjustment of a hinge assembly and a ball lock pin assembly arranged opposite of the hinge assembly, in accordance with some embodiments of the disclosure. Glass panel 302 of FIGS. 4A-4D corresponds to glass panel 302 of FIG. 3 and panel 102 of FIGS. 1A-1C. The components and assemblies depicted in FIGS. 4A-4D may be incorporated, in whole or in part, into any assemblies and components depicted in FIGS. 1A-3 and 5-10. The assemblies of FIGS. 4A-4D may also be used to execute the method of FIG. 11.

Figures 4A, 4B:
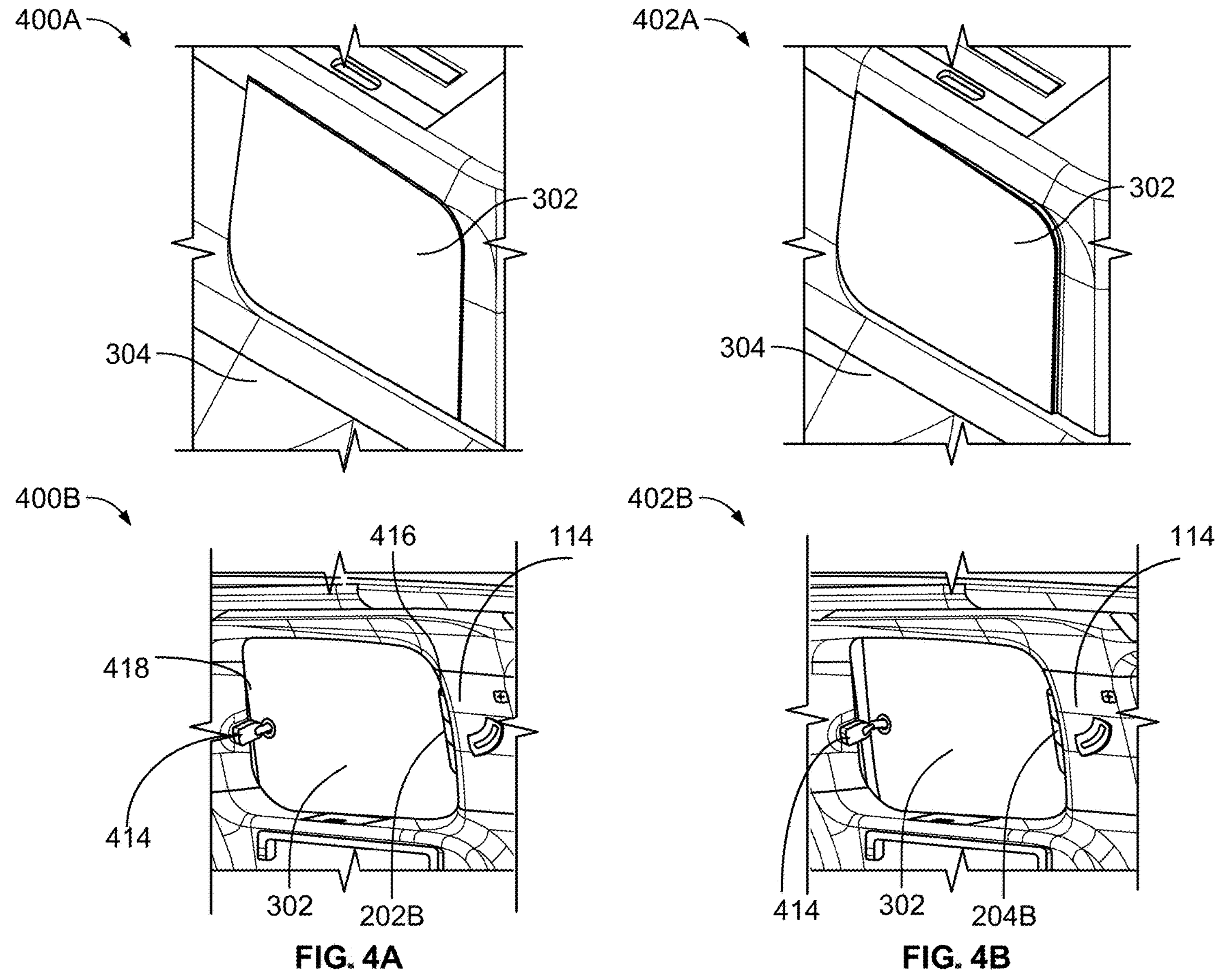

FIG. 4A depicts closed panel assembly exterior 400A and closed panel assembly interior 400B. Closed panel assembly exterior 400A is comprised of glass panel 302 and vehicle body 304. Closed panel assembly exterior 400A corresponds to the portion of vehicle assembly 300 behind C-Pillar 310 of FIG. 3. Close panel assembly interior 400B corresponds to a view of closed panel assembly exterior 400A from a perspective of inside vehicle body 304 looking out through glass panel 302. Glass panel 302 is fixedly attached to hinge assembly 202B at first end 416. As shown in FIG. 4A, hinge assembly 202B is fixedly attached to pillar 114. Arranged on an opposite end of glass panel 302 is ball lock pin assembly 414. Ball lock pin assembly secures second end 418 of glass panel 302 to a portion of vehicle body 304 arranged behind pillar 114 (e.g., one or more of another vehicle pillar, a vehicle interior panel affixed to another vehicle pillar, or some other vehicle interior structure arranged rearward in a vehicle assembly comprised of pillar 114). Glass panel 302 may be coupled to hinge assembly 202B via a bracket (e.g., bracket 124 of FIGS. 1A-2C).

FIG. 4B depicts vented panel assembly exterior 402A and vented panel assembly interior 402B. Vented panel assembly exterior 402A depicts panel 302 angled relative to a surface of vehicle body 304 (e.g., angled based on the actuation range of ball lock pin assembly 414 while a ball lock of the assembly remains engaged with a body of the assembly and according to angle 132 of FIG. 1B, which includes a range of displacement for panel 102 when the ball lock becomes disengaged entirely from a body of the ball lock pin assembly). The angled position of panel 302 shown in vented panel assembly exterior 402A and vented panel assembly interior 402B is achieved based on actuation of ball lock pin assembly 414. Ball lock pin assembly 414 is configured to initially release a portion of a ball lock from ball lock pin assembly 414 to enable second end 418 of panel 302 to be displaced from vehicle body 304. Hinge body 204B of FIG. 2B, for example, enables panel 302 to be angled in response to ball lock pin assembly 414 being actuated to achieve one or more of a vented or open position. The angle of hinge body 204B shown in FIG. 2B is inclusive of the angle of hinge body 204B shown in FIG. 4B.

Figures 4C, 4D:
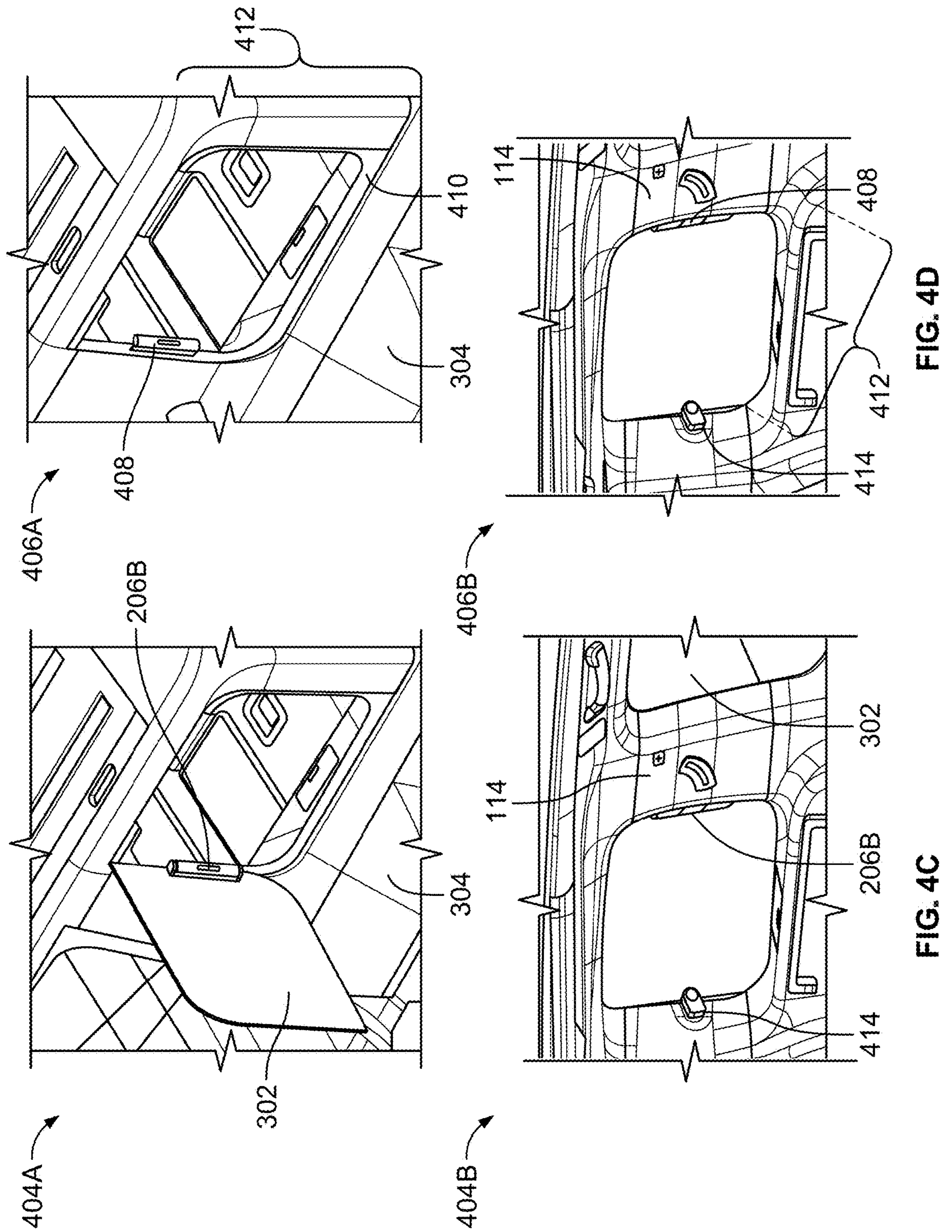

FIG. 4C depicts open panel assembly exterior 404A and open panel assembly interior 404B. Open panel assembly exterior 404A has glass panel 302 angled relative to vehicle body 304 at an angle that is about 90 degrees or less. In some embodiments, a bump stop arranged near hinge assembly 206B of FIG. 2C may limit the angle to 90 degrees or less to prevent glass panel 302 from rotating about hinge assembly 206B to contact a portion of vehicle body 304 arranged in front of pillar 114. Open panel assembly interior 404B depicts released ball lock pin assembly 414, where a ball lock affixed to second end 418 of glass panel 302 is released from a lock based on actuation of a pin. In some embodiments, a different assembly is used than a ball lock pin assembly to achieve a vented position and an open position for panel 302. For example, one or more of a latch, a release, or any actuatable assembly configured for securing, articulating, and releasing a component may be utilized in place of or in combination with a ball lock pin assembly.

FIG. 4D depicts exterior vehicle body without panel 406A and interior vehicle body without panel 406B. Exterior vehicle body without panel 406A comprises vehicle body 304, partial hinge assembly 408 (e.g., without a bracket for mounting a panel), padded gasket 410, and opening 412. Opening 412 corresponds to a portion of vehicle body 304 where glass panel 302 would be arranged in order to close opening 412. Padded gasket 410 is arranged around the perimeter of opening 412 and may be recessed towards the interior of a vehicle assembly comprised of vehicle body 304 in order to improve sealing of padded gasket 410. Padded gasket 410 may be configured of a material for reducing noise exterior to vehicle body 304 as experienced by passengers within vehicle body 304. Padded gasket 410 may also provide a reduction in speed of glass panel 302 as glass panel 302 is arranged over opening 412 to prevent physical deformation or damage to glass panel 302. Interior vehicle body without panel 406B depicts partial hinge assembly 408 as arranged on pillar 114 when glass panel 302 is removed from hinge assembly 206B, resulting in partial hinge assembly 408 (e.g., bracket 124 of FIGS. 1A-1C is removed from hinge assembly 206B by actuation of release lever 126, thereby allowing glass panel 302 with bracket 124 to be removed from vehicle body 304 and creating opening 412).

Figure 5:
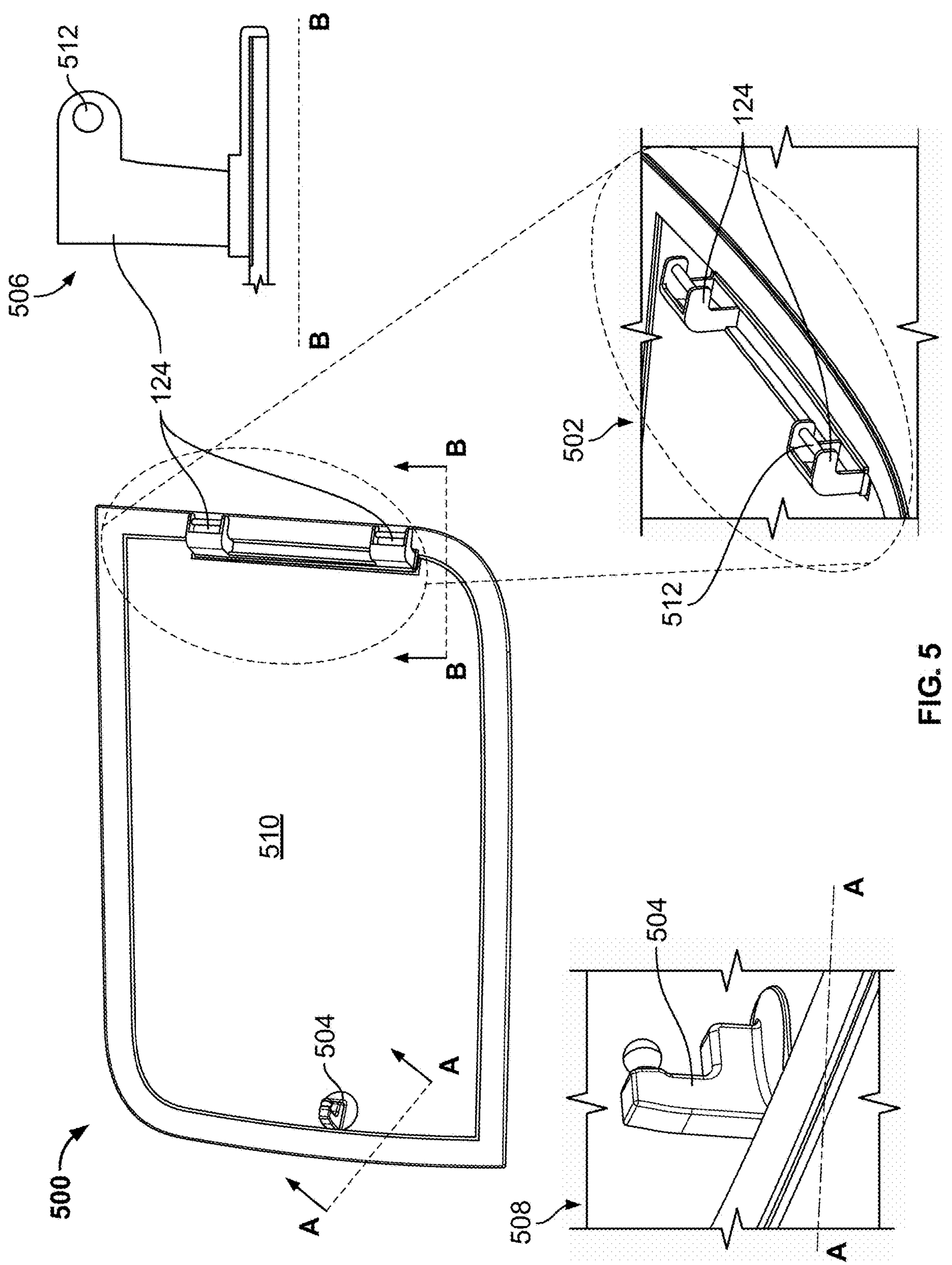
FIG. 5 depicts an example panel assembly with an example bracket and an example ball lock to be received by a ball lock pin assembly of this disclosure, in accordance with some embodiments of the disclosure.

FIG. 5 depicts panel assembly 500 comprised of bracket 124, with side view 506 defined by line B-B and bracket angled view 502, and released ball lock 504, with angled view 508 defined by line A-A, in accordance with some embodiments of the disclosure. Panel assembly 500 may incorporate or be incorporated into any or all of the assemblies and components depicted in FIGS. 1A-4D and 6A-10. Panel assembly 500 may also be used to execute the method of FIG. 11.

Panel assembly 500 is shown from the perspective of a passenger inside a vehicle body looking outwards towards an environment around the vehicle body. Panel assembly 500 is comprised of panel 510. Panel 510 may be comprised of tempered glass or may be comprised of a material suitable for covering a vehicle body exterior. Bracket 124 is comprised of rod 512, which is arranged between bracket sides 514. Rod 512 is configured to be aligned with second hinge 108 of FIGS. 1A-1C. In some embodiments, rod 512 is a single rod extended from a first end of bracket 124 to a second end of bracket 124. In some embodiments, rod 512 is comprised of two sections, with a first section between a first pair of sides of bracket 124 and a second pair of sides of bracket 124 (e.g., resulting in a pair of brackets 124 being arranged on an end of panel 510, as shown in FIG. 5). In some embodiments, released ball lock 504 is a single ball lock. Released ball lock 504 may be arranged anywhere along a side of panel 510 opposite of the side of panel 510 with bracket 124. In some embodiments, at least two of released ball lock 504 are arranged along the side of panel 510 opposite of the side of panel 510 with bracket 124.

Figures 6A, 6B:
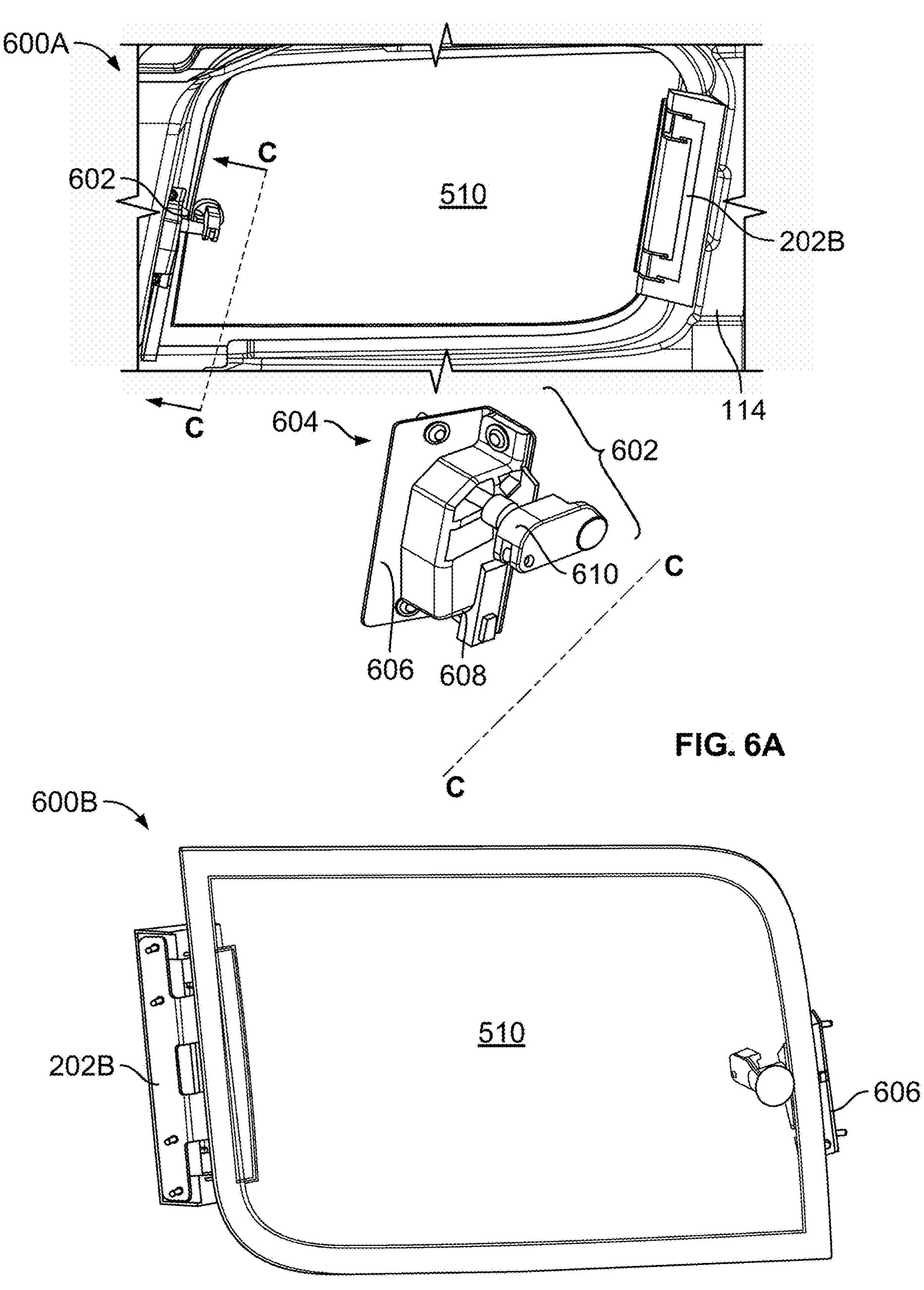
FIGS. 6A and 6B depict a vehicle internal view of a panel and a vehicle external view of a panel, respectively, in accordance with some embodiments of the disclosure.

FIG. 6A depicts vehicle internal view 600A of panel assembly 500 installed in an opening (e.g., opening 412 of FIG. 4D) with hinge assembly 202B of FIG. 2A arranged on an opposite end of panel assembly 500 from ball lock pin assembly 602. FIG. 6B depicts vehicle external view 600B of assembly 500 without opening 412, in accordance with some embodiments of the disclosure. The components and assemblies depicted in FIGS. 6A and 6B may be incorporated, in whole or in part, in any of the assemblies and components depicted in FIGS. 1A-5 and 7A-10. The components and assemblies depicted in FIGS. 6A and 6B may be used to execute the method of FIG. 11.

Internal view 600A depicts panel 510 affixed to pillar 114 via hinge assembly 202B. Arranged on an opposite end of panel 510 from hinge assembly 202B is ball lock pin assembly 602. Ball lock pin assembly 602 is also shown from an angled view as defined by line C-C in view 604. View 604 shows ball lock pin assembly 602 as comprising mounting end 606, main body 608, and secured ball lock 610. Secured ball lock 610 remains secured in main body 608 until either processing circuitry within main body 608 receives instructions to actuate a pin or other mechanism within main body 608 to release secured ball lock 610 (e.g., resulting in released ball lock 504 of FIG. 5) or until a user physically presses on panel 510 to rotate panel 510 about hinge assembly 202B (e.g., to achieve either a vented position as depicted in FIG. 4B, or an open position as depicted in FIG. 4D). Ball lock pin assembly 610 is configured to release an end (e.g., second end 418 of FIG. 4A) of panel 510 when actuated, as previously described. External view 600B shows an external surface of panel 510 as would be seen when installed in vehicle assembly 300 of FIG. 3. As vehicle body 304 is not shown in external view 600B, hinge assembly 202B is visible, as well as mounting end 606 of ball lock pin assembly 602.

FIGS. 7A, 7B, and 7C each depict different steps of reinstalling panel 102 onto a vehicle opening using hinge assembly 702, in accordance with some embodiments of the disclosure. Each of FIGS. 7A-7C depict how components of hinge assembly 702 move relative to each other when reinstalling bracket 124 with panel 102 into hinge assembly 702, resulting in hinge assembly 100A of FIG. 1. The components and assemblies of FIGS. 7A-7C may be incorporated into, in whole or in part, any of the assemblies of components depicted in FIGS. 1A-6B and 8-10. The components and assemblies of FIGS. 7A-7C may also be used to execute the method of FIG. 11.

FIG. 7A shows panel reinstallation step 700A, where bracket 124, which is affixed to panel 102, is displaced from hinge body 118. Hinge body 118 is affixed to pillar 114 via mount 112 and hinge body 118 is engaged with mount 112 via releasable coupling interface 116. Release lever 126 is depicted in a closed position (e.g., as enabled by a spring configured to return release lever 126 to the depicted closed position by creating a closing force about third hinge 110 as shown in FIG. 8).

FIG. 7B shows panel reinstallation step 700B, where bracket 124, which is affixed to panel 102, is moved towards hinge body 118 and second hinge 108. Release lever 126 is rotatably actuated about third hinge 110 in response to force 702 being applied on one or more of bracket 124 or panel 102 such that lever end 704 becomes displaced towards mount 112 of FIG. 7A and creating an opening between hook 130 and a portion of hinge body 118 corresponding to second hinge 108. Lever end 704 is arranged at an opposite end of release lever 126 from hook 130. Hook 130 is configured to engage with rod 512 of bracket 124. Rod 512 is aligned with second hinge 108 and is used to secure bracket 124 to hinge body 118 when hook 130 engages rod 512.

FIG. 7C shows panel reinstallation step 700C, where bracket 124 is coupled to hinge body 118 at second hinge 108. Release lever 126 is returned to a closed position (e.g., an original position), as shown in FIG. 7A, as force 702 is no longer being applied to one or more of bracket 124 or panel 102 to displace hook 130. Hook 130 and rod 512 together form second hinge 108. In some embodiments, a force is applied to lever end 704 to rotatably displace hook 130 from rod 512 and the process of reinstalling bracket 124 and panel 102 shown in FIGS. 7A-7C may be reversed (e.g., starting at FIG. 7C where a force is applied at lever end 704 and ending at FIG. 7A).

FIG. 8 depicts hinge assembly 800 comprised of spring 804 for returning release lever 126 to an original position after being pressed (e.g., to release bracket 124 from hinge body 118), in accordance with some embodiments of the disclosure. Hinge assembly 800 may be incorporated, in whole or in part, into any of the components and assemblies depicted in FIGS. 1A-7C, 9, and 10. Hinge assembly 800 may be used to execute the method of FIG. 11. Bracket 124 with rod 512 is shown without hinge body 118. Release lever 126 is also shown coupled to rod 802 corresponding to third hinge 110. Wrapped around rod 802 and fixedly attached to release lever 126 is spring 804. Spring 804 may be comprised of one or more of a torsional spring, a helical spring, or any wound material with elastic properties capable of returning release lever 124 to an original position (e.g., after a force is applied to an end as shown in FIGS. 7A-7C). Spring 804 may be arranged to generate one or more of an axial return force, a tangential return force, a radial return force, or a radial/tangential return force about third hinge 110 to return release lever 126 to an original position (e.g., as shown in FIGS. 1A and 7C). For example, force arrow 808 depicts a depression force being applied at an end of spring 804 that results in a corresponding spring reaction force, hence the double sided arrow being used to depict force arrow 808. Additionally, rotational arrows 806 depict how a lever or member being coupled to an end of spring 808 would have corresponding rotational reactions aligned with whether force arrow 808 is being influenced by a depressive force or a spring reaction force.

FIG. 9 depicts pillar surface 900 of vehicle pillar 114, in accordance with some embodiments of the disclosure. Pillar surface 900 may be incorporated into any or all of the assemblies and components depicted in FIGS. 1A-8 and 10. Pillar surface 900 may be a mounting surface for a hinge assembly configured to execute the method of FIG. 11. Pillar surface 900 faces vehicle interior 902. Pillar surface 900 is comprised of recess 904. A hinge assembly (e.g., hinge assembly 202B of FIG. 2A) may be arranged within recess 904. When the hinge assembly is arranged within recess 904 and fixedly attached to pillar surface 900 (e.g., using fasteners 208), gap 210 of FIGS. 2A-2C is visible for a passenger of a vehicle comprising pillar surface 900 to access in order to actuate a vehicle panel via the hinge assembly. A handle of the hinge assembly (e.g., handle 128) is arranged within the recess. A surface of the hinge assembly is flush with pillar surface 900 when installed in recess 904.

FIG. 10 depicts vehicle assembly 1000, which is comprised of panel 1008 (e.g., corresponding to any or all of panels 102, 302, or 510) and hinge assembly 1006 (e.g., hinge assembly 100A of FIG. 1A), in accordance with some embodiments of the disclosure. Vehicle assembly 1000 may incorporate or be incorporated into, in whole or in part, vehicle assembly 300 of FIG. 3. Vehicle assembly 1000 may incorporate any or all of the components depicted in FIGS. 1A-9. Vehicle assembly 1000 may be configured to execute the method of FIG. 11.

Vehicle assembly 1000 includes vehicle body 1002. Arranged within vehicle body 1002 are vehicle pillar 1004 (e.g., pillar 114), panel 1008, and processing circuitry 1012. Processing circuitry may be located in a single location within vehicle assembly 1000 or may be divided between multiple computing apparatuses (e.g., multiple vehicle modules configured to interface with each other via a vehicle network to control various actuators, systems, and subsystems incorporated into vehicle assembly 1000). Affixed to vehicle pillar 1004 is hinge assembly 1006. Hinge assembly 1006 is coupled to panel 1008, which includes ball lock pin assembly 1010 (e.g., ball lock pin assembly 602 of FIG. 6A). Ball lock pin assembly 1010 is communicatively coupled to ball lock button 1014 (e.g., ball lock pin assembly 1010 can receive instructions over a vehicle network from ball lock button 1013 or processing circuitry 1012 in order to release a ball lock via a pin within a main body of ball lock pin assembly 1010). For example, actuation of ball lock pin assembly 1010 may first lead to a vented position where a ball end remains engaged with an assembly body. In some embodiments, ball lock pin assembly 1010 may be configured to close an opening formed between a panel actuated by ball lock pin assembly 1010 and a vehicle body in response to receiving an instruction to close (e.g., the assembly body may be configured to pull the ball end towards a position pulling the panel flush with a perimeter of a vehicle opening. In some embodiments, a vehicle occupant may manually release a ball end from the assembly body (e.g., to fully open the panel relative to the vehicle body or remove it) or the use may press a release button to have instructions transmitted to the assembly body to release the ball end.

Ball lock button 1014 is communicatively coupled to processing circuitry 1012 and is configured to receive a passenger input. In response to the passenger input to ball lock button 1014, ball lock pin assembly receives instructions via a non-transitory computer readable medium containing computer readable instructions to actuate and release a ball pin (e.g., enabling manual articulation of the panel about a hinge assembly arranged on an end of the panel opposite of where ball lock pin assembly is arranged). The methods and/or any instructions for performing any of the embodiments discussed herein may be encoded on computer-readable media. Computer-readable media includes any media capable of storing data. The computer-readable media may be transitory, including, but not limited to, propagating electrical or electromagnetic signals, or may be non-transitory including, but not limited to, volatile and non-volatile computer memory or storage devices such as a hard disk, floppy disk, USB drive, CD, media cards, register memory, processor caches, Random Access Memory (RAM), etc.

FIG. 11 is a flow chart of method 1100 of removing a vehicle panel via a hinge assembly of this disclosure, in accordance with some embodiments of the disclosure. Method 1100 may be executed, in whole or in part, using any or all of the components and assemblies depicted in FIGS. 1A-10.

At step 1102, a panel (e.g., one or more of panel 102, panel 302, or panel 510) may be moved from a closed position to a vented position. For example, a ball lock pin assembly (e.g., ball lock pin assembly 602) may be actuated such that the panel rotates about an axis (e.g., corresponding to first hinge 106) to achieve the vented position. The actuation may be manual (e.g., a user pressing on the panel), or the actuation may be caused by a passenger providing an input (e.g., one or more of speaking, providing a text command, or providing an input to a screen or button) to vehicle processing circuitry (e.g., based on instructions transmitted or received on a vehicle network via a non-transitory computer readable medium) to cause an actuator of the ball lock pin assembly to modify a position of a ball lock within a main body of the ball lock pin assembly. In some embodiments, the ball lock pin assembly is actuated such that the panel rotates about a second axis, that is parallel to a first axis, to achieve the vented position. This can be caused by manually pressing on an end of the window or having a ball end released from a ball lock pin assembly body to achieve the vented position. An arm affixed to the ball end may be forced outwards from the body (e.g., by an actuator in the body that actuates in response to a button press or other input) such that at least part of the arm protrudes from the body while the ball end remains coupled to the body. The ball end may then be removed from the body that the panel can freely rotate about one or more of the first axis or the second axis (e.g., achieving a vented or angled position that includes an opening between the panel and a vehicle body corresponding to an angle up to a perpendicular arrangement between the panel and one or more of a vehicle body line or vehicle pillar line).

At step 1104, a handle (e.g., handle 128) of a hinge body (e.g., hinge body 118) is rotated about an axis (e.g., corresponding to first hinge 106) relative to a pillar (e.g., pillar 114). At step 1106, the panel is rotated about a second axis (e.g., corresponding to second hinge 108) relative to the hinge body. At step 1108, a release lever (e.g., release lever 126) is moved (e.g., moved rotationally about an axis defined by third hinge 110) to disengage the panel from the hinge body. For example, the release lever may comprise a hook that is coupled to a rod of a bracket to which the panel is affixed. When the release lever is pressed at an end opposite an end of the release lever with the hook, the hook disengages from the rod of the bracket and the panel can be removed from the hinge body (e.g., as shown in FIGS. 4A-4D).

The foregoing is merely illustrative of the principles of this disclosure and various modifications may be made by those skilled in the art without departing from the scope of this disclosure. The above described embodiments are presented for purposes of illustration and not of limitation. The present disclosure also can take many forms other than those explicitly described herein. Accordingly, it is emphasized that this disclosure is not limited to the explicitly disclosed methods, systems, and apparatuses, but is intended to include variations to and modifications thereof, which are within the spirit of the following claims.

What is claimed is:

1. A hinge assembly comprising:
a mount fixedly attached to a vehicle pillar surface;
a hinge body affixed to the mount by a first hinge;
a bracket fixedly attached to a panel, the bracket coupled to the hinge body by a second hinge; and
a release lever configured to release the bracket from the hinge body, wherein:
the release lever is spring loaded;
the release lever releases the bracket when a force is applied to a surface of the release lever, and
the release lever returns to an original position when the force applied to the surface of the release lever is removed.

2. The hinge assembly of claim 1, wherein the hinge body comprises a handle configured to rotate about the first hinge.

3. The hinge assembly of claim 1, further comprising a releasable coupling interface between the hinge body and the mount or the surface.

4. The hinge assembly of claim 3, wherein the releasable coupling interface comprises a magnetic interface.

5. The hinge assembly of claim 1, wherein the surface comprises a vehicle pillar.

6. The hinge assembly of claim 1, wherein the bracket is coupled to the hinge body by the second hinge.

7. The hinge assembly of claim 1, wherein the release lever is configured to release a hook that interfaces with the a rod of the bracket when the release lever is actuated.

8. The hinge assembly of claim 1, wherein:
the hinge body is comprised of plastic; and
the mount comprises a metal plate that is fixedly attached to a vehicle pillar.

9. A vehicle window assembly comprising:
a glass panel fixedly attached to a hinge assembly, the hinge assembly comprising:
a mount fixedly attached to a vehicle pillar surface,
a hinge body affixed to the mount by a first hinge,
a bracket fixedly attached to a first end of the glass panel, the bracket coupled to the hinge body by a second hinge, and
a release lever configured to release the bracket from the hinge body; and
a ball lock pin assembly fixedly attached to the glass panel at a second end.

10. The vehicle window assembly of claim 9, further comprising a handle configured to rotate about the hinge assembly.

11. The vehicle window assembly of claim 9, further comprising a releasable coupling interface between the hinge body and the mount or the vehicle pillar surface.

12. The vehicle window assembly of claim 9, wherein the ball lock pin assembly is configured to release the second end of the glass panel when actuated.

13. The vehicle window assembly of claim 10, wherein:
the release lever is spring loaded;
the release lever releases the bracket when a force is applied to a surface of the release lever; and
the release lever returns to an original position when the force applied to the surface of the release lever is removed.

14. The vehicle window assembly of claim 9, further comprising a padded gasket arranged around a perimeter of the glass panel.

15. The vehicle window assembly of claim 9, wherein:
the hinge assembly comprises the first hinge and the second hinge;
the first hinge corresponds to an axis of rotation for the release lever and the hinge body; and
the second hinge corresponds to an axis of rotation for the glass panel.

16. The vehicle window assembly of claim 9, wherein the glass panel is comprised of tempered glass.

17. The vehicle window assembly of claim 9, wherein the release lever is configured to release a hook that interfaces with the bracket when the release lever is actuated.

18. A vehicle pillar assembly comprising:

a pillar surface facing an interior of a vehicle and comprising a recess; and a hinge assembly for actuating a panel, the hinge assembly comprising:

a handle arranged within the recess, a mount fixedly attached to the pillar surface, a hinge body affixed to the mount by a first hinge, a bracket fixedly attached to the panel, the bracket coupled to the hinge body by a second hinge, and a release lever configured to release the bracket from the hinge body, wherein:

the release lever is spring loaded;

the release lever releases the bracket when a force is applied to a surface of the release lever;

the release lever returns to an original position when the force applied to the surface of the release lever is removed;

a mount surface of the hinge assembly is flush with the pillar surface;

a gap is arranged between the handle and the recess; and the panel is removably coupled to the hinge assembly.

19. The vehicle pillar assembly of claim 18, further comprising a releasable coupling interface between the hinge body and the mount or the surface.

* * * * *